United States Patent
Hart et al.

(10) Patent No.: US 12,160,859 B2
(45) Date of Patent: *Dec. 3, 2024

(54) OVER-THE-WIRE ACCESS POINT COORDINATION

(71) Applicant: Cisco Technology, Inc., San Jose, CA (US)

(72) Inventors: Brian D. Hart, Sunnyvale, CA (US); Malcolm M. Smith, Richardson, TX (US); Sanjay K. Katabathuni, Fremont, CA (US); Pooya Monajemi, San Jose, CA (US); Venkataprasad Chirreddy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,630

(22) Filed: Jun. 9, 2023

(65) Prior Publication Data
US 2023/0328717 A1 Oct. 12, 2023

Related U.S. Application Data

(63) Continuation of application No. 17/443,403, filed on Jul. 26, 2021, now Pat. No. 11,729,762.

(51) Int. Cl.
*H04W 72/1263* (2023.01)
*H04W 72/21* (2023.01)
(Continued)

(52) U.S. Cl.
CPC ....... *H04W 72/1263* (2013.01); *H04W 72/21* (2023.01); *H04W 72/52* (2023.01); *H04W 72/569* (2023.01)

(58) Field of Classification Search
CPC ..... H04L 1/0041; H04L 1/0045; H04L 5/001; H04L 5/0051; H04L 5/0055; H04L 1/00;
(Continued)

(56) References Cited

U.S. PATENT DOCUMENTS

| 2009/0086689 | A1* | 4/2009 | Hunt | H04W 28/06 |
| | | | | 370/338 |
| 2012/0230242 | A1* | 9/2012 | Kim | H04B 7/0452 |
| | | | | 370/312 |

(Continued)

FOREIGN PATENT DOCUMENTS

| WO | WO-2013107004 A1 * | 7/2013 | ........ H04W 74/0816 |
| WO | WO-2021222374 A1 * | 11/2021 | ............ H04B 7/024 |
| WO | WO-2022051408 A1 * | 3/2022 | ........... H04L 5/0005 |

*Primary Examiner* — Nathan S Taylor
(74) *Attorney, Agent, or Firm* — Patterson + Sheridan, LLP

(57) ABSTRACT

A method includes determining whether a first access point of a plurality of access points and a second access point of the plurality of access points should communicate simultaneously over a shared channel in a first network and in response to determining that one of the plurality of access points won contention of a transmission opportunity for the shared channel, dividing the transmission opportunity into a plurality of time slots. The method also includes scheduling transmissions of the first and second access points into the plurality of time slots according to the determination whether the first and second access points should communicate simultaneously over the shared channel and communicating, to the second access point and over a wired network or a second network different from the first network, an indication of whether the second access point should communicate during a first time slot of the plurality of time slots.

20 Claims, 6 Drawing Sheets

(51) Int. Cl.
*H04W 72/52* (2023.01)
*H04W 72/566* (2023.01)

(58) Field of Classification Search
CPC ............... H04L 5/00; H04W 72/0453; H04W 72/1268; H04W 72/1289; H04W 72/14; H04W 72/1263; H04W 72/1278; H04W 72/12; H04W 72/04
See application file for complete search history.

(56) References Cited

U.S. PATENT DOCUMENTS

| | | | |
|---|---|---|---|
| 2014/0177605 A1* | 6/2014 | Kwon | H04W 72/23 370/336 |
| 2016/0050684 A1* | 2/2016 | Ni | H04W 72/12 370/329 |
| 2017/0019923 A1* | 1/2017 | Agardh | H04W 74/0808 |
| 2017/0163315 A1* | 6/2017 | Wu | H04B 15/00 |
| 2018/0205429 A1* | 7/2018 | Venkatachalam Jayaraman | H04B 7/024 |
| 2018/0206274 A1* | 7/2018 | Cherian | H04B 7/0417 |
| 2018/0212655 A1* | 7/2018 | Venkatachalam Jayaraman | H04B 7/0626 |
| 2020/0076552 A1* | 3/2020 | Cherian | H04B 7/024 |
| 2020/0077273 A1* | 3/2020 | Cherian | H04W 16/14 |
| 2020/0092793 A1* | 3/2020 | Henry | H04W 64/003 |
| 2021/0099256 A1* | 4/2021 | Lee | H04L 1/1893 |
| 2022/0103208 A1* | 3/2022 | Yu | H04L 69/24 |

\* cited by examiner

OVER-THE-WIRE ACCESS POINT COORDINATION

CROSS-REFERENCE TO RELATED APPLICATIONS

This application is a continuation of U.S. patent application Ser. No. 17/443,403 filed Jul. 26, 2021. The aforementioned related patent application is herein incorporated by reference in its entirety.

TECHNICAL FIELD

Embodiments presented in this disclosure generally relate to access point coordination. More specifically, embodiments disclosed herein relate to an over-the-wire multi-access point coordination process.

BACKGROUND

Many access points may be distributed across an area to provide network coverage for that area. When these access points attempt to transmit messages to connected devices simultaneously, the transmission from the access points may interfere with one another and cause congestion in the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
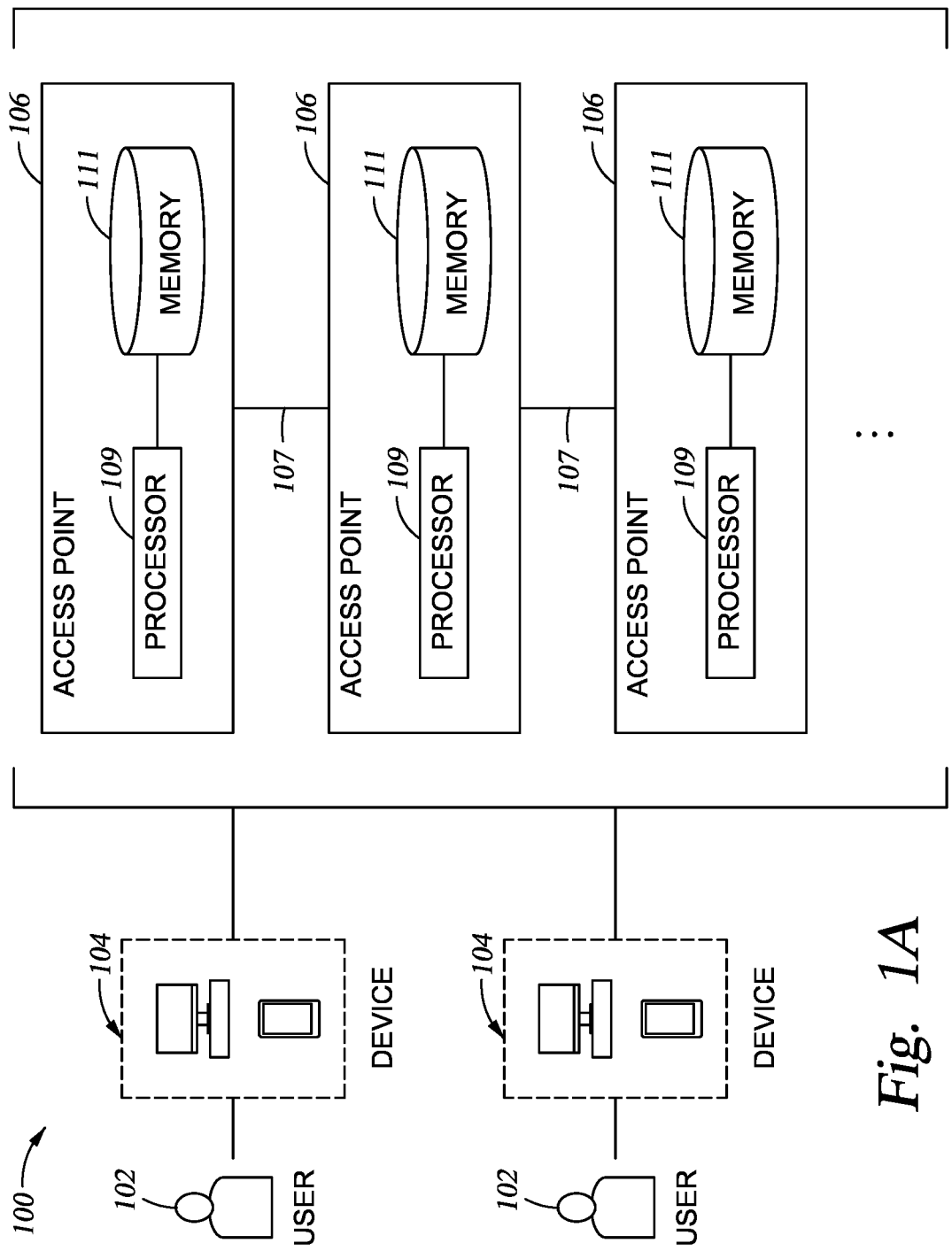
FIG. 1A illustrates an example system.

According to an embodiment, a method includes determining, based on signal metrics reported by a plurality of access points assigned to a first control group, whether a first access point of the plurality of access points and a second access point of the plurality of access points should communicate simultaneously over a shared channel in a first network and in response to determining that one of the plurality of access points won contention of a transmission opportunity for the shared channel, dividing the transmission opportunity into a plurality of time slots. The method also includes scheduling transmissions of the first and second access points into the plurality of time slots according to the determination whether the first and second access points should communicate simultaneously over the shared channel and communicating, to the second access point and over one of a wired network or a second network different from the first network, an indication of whether the second access point should communicate during a first time slot of the plurality of time slots. Other embodiments include an apparatus that performs this method.

According to another embodiment, a method includes determining whether a plurality of access points assigned to a first control group should communicate simultaneously over a shared channel in a first network and dividing a transmission opportunity for the shared channel into a plurality of time slots. The method also includes scheduling transmissions of the plurality of access points into the plurality of time slots according to the determination whether the plurality of access points should communicate simultaneously over the shared channel and communicating, to the plurality of access points and over one of a wired network or a second network different from the first network, an indication of whether the plurality of access points should communicate during a first time slot of the plurality of time slots. Other embodiments include an apparatus that performs this method.

EXAMPLE EMBODIMENTS

This disclosure describes a system in which access points are assigned to control groups. Each control group has an access point that serves as the leader of the control group. When an access point in the control group wins contention of a transmission opportunity, the leader of the control group divides the transmission opportunity into time slots. The leader then schedules transmissions for the access points in the control group to the time slots. For example, the leader may determine whether certain access points in the control group can transmit simultaneously during the same time slot (e.g., according to coordinated spatial reuse (CSR)) or whether the access points should transmit in separate time slots (e.g., according to time division multiple access (TDMA)). The leader then communicates an indication of the scheduling to the access points in the control group over a separate wired or wireless network. In this manner, the system reduces congestion and interference in the network by coordinating the access points using control groups, in certain embodiments. Additionally, the system further reduces congestion and interference by coordinating the access points over a separate network.

FIG. 1A illustrates an example system 100. As seen in FIG. 1A, the system 100 includes one or more devices 104 and one or more access points 106. The devices 104 connect to the access points 106 to gain access to a network. The access points 106 may be assigned to control groups. The access points 106 in a control group coordinate their communications over a hardwire to reduce congestion and interference within the system 100, in certain embodiments.

A user 102 uses a device 104 to connect to an access point 106. The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The system 100 includes any suitable number of access points 106 that provide connected devices 104 access to a network. The access points 106 may be distributed across an area to provide network coverage for that area. The access points 106 may be assigned to control groups. The access points 106 within a control group coordinate their communications within the system 100 to reduce congestion and/or interference in, certain embodiments. As seen in FIG. 1A, the access points 106 include processors 109 and memories 111, which are configured to perform any of the actions or functions of the access points 106 described herein.

The processor 109 is any electronic circuitry, including, but not limited to one or a combination of microprocessors, microcontrollers, application specific integrated circuits (ASIC), application specific instruction set processor (ASIP), and/or state machines, that communicatively couples to memory 111 and controls the operation of the access point 106. The processor 109 may be 8-bit, 16-bit, 32-bit, 64-bit or of any other suitable architecture. The processor 109 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 109 may include other hardware that operates software to control and process information. The processor 109 executes software stored on the memory 111 to perform any of the functions described herein. The processor 109 controls the operation and administration of the access point 106 by processing information (e.g., information received from the devices 104 and memory 111). The processor 109 is not limited to a single processing device and may encompass multiple processing devices.

The memory 111 may store, either permanently or temporarily, data, operational software, or other information for the processor 109. The memory 111 may include any one or a combination of volatile or non-volatile local or remote devices suitable for storing information. For example, the memory 111 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 111, a disk, a CD, or a flash drive. In particular embodiments, the software may include an application executable by the processor 109 to perform one or more of the functions described herein.

The access points 106 coordinate their communications over a network separate from the network used by the devices 104. This separate network may be a wired or wireless network. In the example of FIG. 1A, the access points 106 are connected to one another by one or more hardwires 107 that provide a separate wired network. The access points 106 exchange information with each other over the hardwires 107. For example, the access points 106 in a control group may exchange scheduling information over a hardwire 107 to coordinate their communications within the system 100. By exchanging coordination information over the hardwire 107 rather than wirelessly, the access points 106 reduce wireless congestion and/or interference in certain embodiments. Additionally by coordinating when the access points 106 communicate wirelessly, the access points 106 further reduce congestion and/or interference within the system 100 in some embodiments.

Figure 1B:
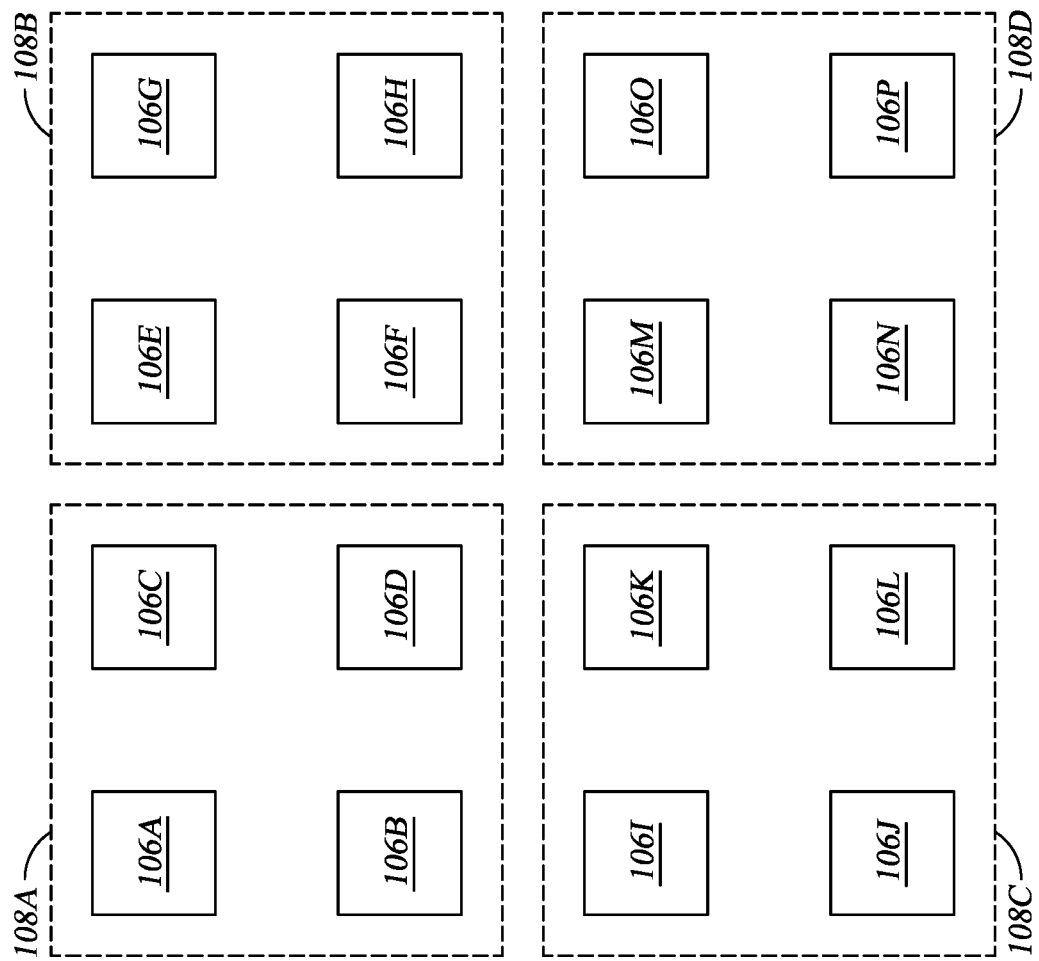
FIGS. 1B and 1C illustrate example control groups in the system of FIG. 1A.
Figure 1C:
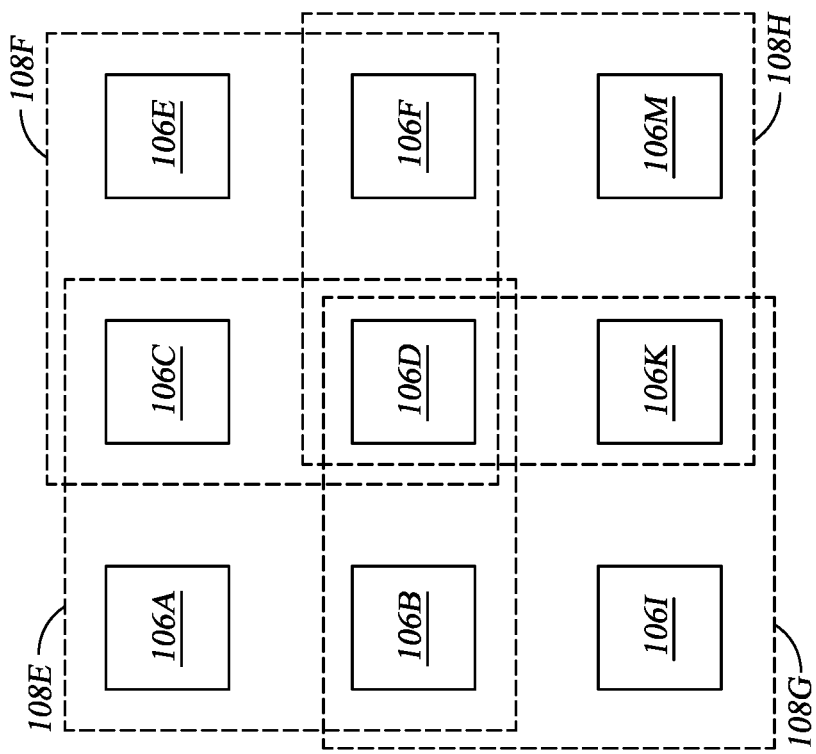

The access points 106 in the system 100 are assigned to control groups. An access point 106 then has its communications scheduled with the other access points 106 in the same control group or control groups. FIGS. 1B and 1C illustrate example control groups 108 in the system 100 of FIG. 1A. FIG. 1B illustrates an example in which the access points 106 are assigned to single coordination groups. Stated differently, each access point 106 in the system 100 is assigned to at most one control group 108. As seen in FIG. 1B, the access points 106A, 106B, 106C, and 106D are assigned to the control group 108A. The access points 106E, 106F, 106G, and 106H are assigned to the control group 108B. The access points 106I, 106J, 106K, and 106L are assigned to the control group 108C. The access points 106M, 106N, 106O, and 106P are assigned to the control group 108D. One of the access points 106 in each control group 108 is considered the leader of that control group 108. The leader of each control group 108 schedules transmissions for the other access points 106 in the control group 108. The leader then communicates the scheduling information to the other access points 106 in the control group 108 using a hardwire 107. As a result, an access point 106 has its transmissions coordinated with only the other access points 106 in the same control group 108. Additionally, the leaders of the control groups 108 coordinate the transmissions of the access points 106 in the control groups 108 which reduces congestion and/or interference in particular embodiments.

FIG. 1C shows an example in which the access points 106 are assigned to multiple control groups 108. As seen in FIG. 1C, the access points 106A, 106B, 106C, and 106D are assigned to the control group 108E. The access points 106C, 106D, 106E, and 106F are assigned to the control group 108F. The access points 106B, 106I, 106D, and 106K are assigned to the control group 108G. The access points 106D, 106K, 106F, and 106M are assigned to the control group 108H. Each access point 106 may therefore be assigned to multiple control groups 108, which may provide each access point 106 multiple transmission opportunities provided by the control groups 108 to which the access point 106 is assigned. As a result, each access point 106 may transmit in a transmission opportunity won by whichever control group to which the access point 106 is assigned. Additional coordination, however, may be needed between the leaders of the control groups 108 to reduce conflicts arising from scheduling transmission opportunities for an access point 106 that has already made its transmission during a transmission opportunity of another control group 108.

Figure 1D:
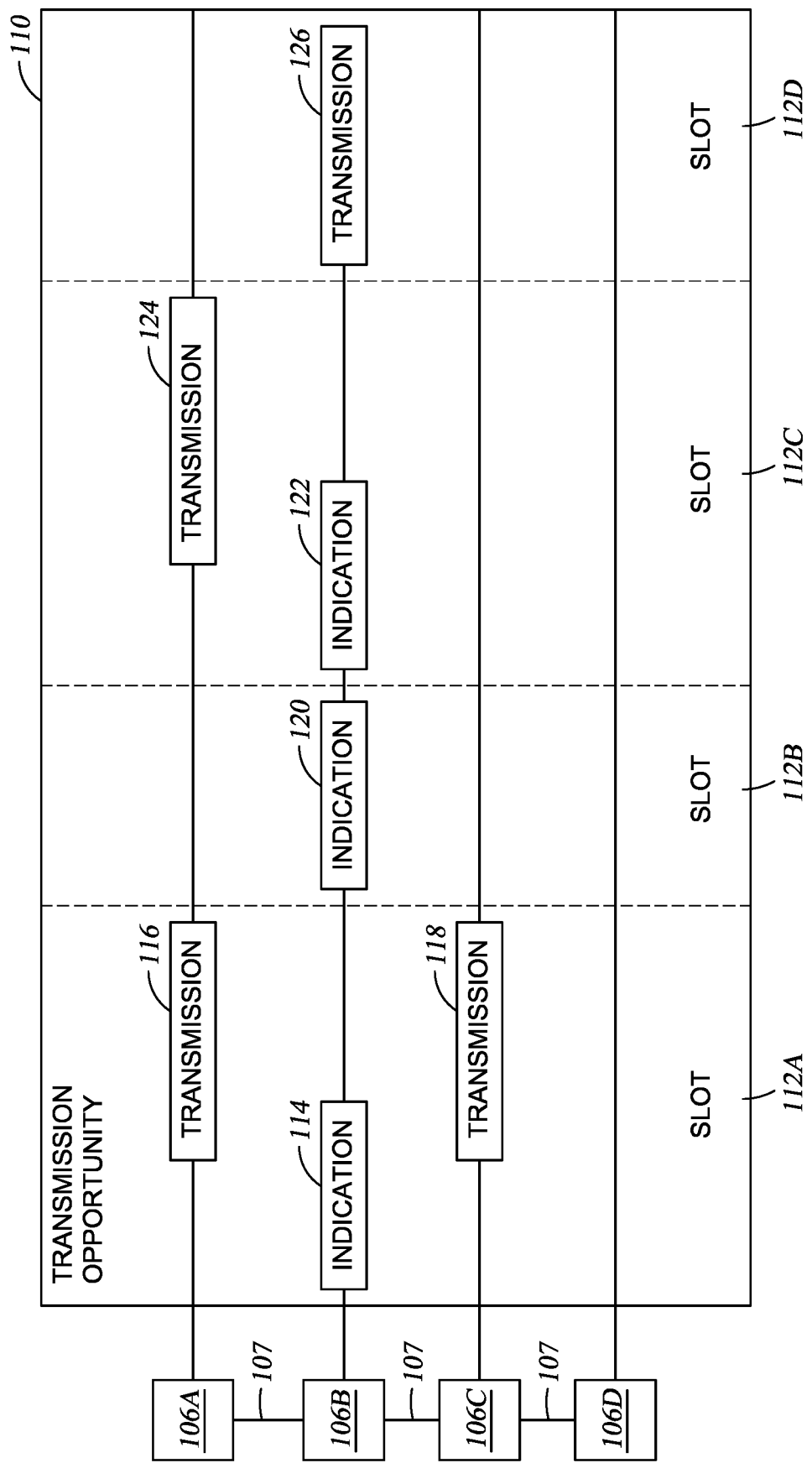
FIG. 1D illustrates an example coordination process in the system of FIG. 1A.

FIG. 1D illustrates an example coordination process in the system 100 of FIG. 1A. As seen in FIG. 1D, the access points 106A, 106B, 106C, and 106D are assigned to the same control group (e.g., one of the control groups 108 illustrated in FIG. 1B or 1C). Additionally, the access points 106A, 106B, 106C, and 106D are connected by a hardwire 107. Although any of the access points 106A, 106B, 106C, and 106D may be the leader of the control group, for the purposes of the example of FIG. 1D, the access point 106B is the leader of the control group.

The access point 106B determines that an access point 106 in the control group has won contention of a transmission opportunity 110. Each of the access points 106A, 106B, 106D, and 106D may contend for the transmission opportunity 110. Each of the access points 106A, 106B, 106C, and 106D may contend for the transmission opportunity 110 with other access points 106 assigned to other control groups. A network controller (not shown) that services the access points 106 of the different control groups may determine which access point 106 should be awarded the transmission opportunity 110. For example, the network controller may consider the amount of traffic being held by the access points 106 or by devices 104 connected to the access points 106, a priority of this traffic, and/or a length of time for which the access point 106 has not been awarded a transmission opportunity 110. The network controller may award the transmission opportunity 110 to the access point 106 that has the most traffic or the most high priority traffic awaiting transmission. The transmission opportunity 110 provides a period of time during which an access point 106 or access points 106 are allowed to transmit over a channel. The leader of the control group may allow the access points 106 in a control group to share the channel by coordinating transmissions over the channel during the transmission opportunity.

If the access point 106 that won the transmission opportunity 110 is not the leader of the control group, then the access point 106 reports to the leader of the control group that the access point 106 won the transmission opportunity 110. The access point 106 may make this report over the hardwire 107. If the access point 106 that won the transmission opportunity 110 is the leader of the control group, then no report is needed. The leader of the control group then divides the transmission opportunity 110 into time slots 112. The leader may divide the transmission opportunity 110 into any suitable number of time slots 112 to provide the access points 106 in the control group an adequate opportunity to make one or more transmissions during the time slots 112.

The leader of the control group then coordinates transmission times for the access points 106 in the control group by scheduling the access points 106 to transmit during one or more time slots 112 over the shared channel. In the example of FIG. 1D, the access point 106B determines that one of the access points 106A, 106B, 106C, and 106D has won the transmission opportunity 110. The access point 106B then divides the transmission opportunity 110 into time slots 112A, 112B, 112C, and 112D. The access point 106B then schedules transmissions for the access points 106A, 106B, 106C, and 106D into the time slots 112A, 112B, 112C, and 112D. The access point 106D may schedule the transmissions for the access points 106A, 106B, 106C, and 106D based on any suitable information. For example, the access point 106B may schedule transmissions based on buffer status reports from the access points 106A, 106C, and 106D. The buffer status reports may be communicated to the access point 106B at various intervals (e.g., once every 500 microseconds or after information in a previous buffer status report has become stale). The buffer status reports indicate an amount of traffic waiting at the access points 106A, 106C, and 106D or at devices 104 connected to the access points 106A, 106C, and 106D and/or an amount of time that the traffic has been waiting. The access point 106B may schedule transmissions to reduce the amount of traffic waiting for transmission. The more traffic that is waiting at an access point 106 or at a device 104 connected to that access point 106, the more transmissions that the access point 106B may be scheduled.

When scheduling transmissions, the access point 106B also determines whether certain access points 106 in the control group may transmit simultaneously over the shared channel during the same time slot 112 based on signal metrics reported by the access points 106. For example, the access point 106B may make this determination based on a distance between the access points 106. If the distance between the access points 106 is large then the access point 106B may determine that the access points 106 may transmit simultaneously without those transmissions interfering with each other. As another example, the access point 106B may make this determination based on inter-access point signal strength reported by the access points 106. The access point 106B evaluates the signal strengths between different pairs of access points 106 in the control group to determine which access points 106 are less likely to interfere with one another if the access points were to transmit simultaneously. The lower the inter-access point signal strength between two access points 106, the less likely those access points 106 are to interfere with one another. In response, the access point 106B schedules transmissions for those access points 106 during the same time slot 112 (e.g., according to a CSR process). If the access point 106B determines that the access points 106 should not transmit simultaneously during the same time slot, then the access point 106B schedules transmissions for the access points 106 in different time slots 112 (e.g., according to a TDMA process). The access points 106 may handle uplink and/or downlink traffic during a time slot 112.

In the example of FIG. 1D, the access point 106B determines that the access points 106A and 106C may transmit simultaneously over the shared channel during the time slot 112A. The access point 106B communicates an indication 114 to the access points 106A and 106C over a separate network (e.g., a wired network supported by the hardwire 107 and separate from the network that supports the shared channel or a wireless network separate from the network that supports the shared channel) to instruct the access points 106A and 106C to transmit during the time slot 112A. The indication 114 may include a modulation coding scheme to be used by the access points 106A and 106C. The access points 106A and 106C then transmit transmissions 116 and 118 simultaneously during the time slot 112A.

The access point 106B may determine that the access points 106A and 106C should make subsequent transmissions in separate time slots 112 (e.g., because the subsequent traffic may have different priorities or certain sequencing requirements). In the example of FIG. 1D, the access point 106B determines that the access point 106C should transmit during the time slot 112B. The access point 106B communicates an indication 120 over the hardwire 107 to the access point 106C instructing the access point 106C to transmit during the time slot 112B. The access point 106C may not respond to the indication 120 (e.g., the traffic waiting at the access point 106C may have timed out or the access point 106C may have determined that the intended recipient devices 104 of that traffic have connected to a different access point 106). As a result, no transmissions are made during the time slot 112B. The access point 106B determines that the access point 106A should transmit during the time slot 112C. The access point 106B communicates an indication 122 to the access point 106A over the hardwire 107 to instruct the access point 106A to transmit during the time slot 112C. The access point 106A makes a transmission 124 during the time slot 112C. The indications 120 and 122 may include time limits set for the time slots 112B and 112C (e.g., a time for when transmissions may begin and a time when transmissions should end). The access point 106B determines that it should transmit during the time slot 112D. The access point 106B then makes a transmission 126 during the time slot 112D.

The access point 106B may have determined that no transmissions should be scheduled for the access point 106D during the transmission opportunity 110. For example, the access point 106B may determine from the buffer status report from the access point 106D that little or no traffic is waiting for transmission at the access point 106D or at devices 104 connected to the access point 106D. In response, the access point 106B determines that the access point 106D should wait for the next transmission opportunity 110 to transmit.

The indications 114, 120, and 122 may include information to identify the transmission opportunity 110 and the time slots 112. For example, ten bits may be used to identify the transmission opportunity 110 and two bits may be used to identify the time slots 112. Additionally, a modulo counter may be used to recycle the identifiers for the transmission opportunities 110 and/or the time slots 112. Four bits in the indications 114, 120, and 122 may be used to represent the modulo counter. The indications 114, 120, and 122 may also include a maximum time allocated to a particular slot 112.

In certain embodiments, the indications 114, 120, and 122 indicate a minimum priority of traffic that the access points 106 are allowed to transmit during the time slots 112A, 112B, and 112C, respectively. The access points 106 that are scheduled to transmit during the corresponding time slots 112 transmit traffic that has a priority that meets or exceeds the minimum priority of traffic indicated by the indications 114, 120 or 122. As a result, the access point 106B prioritizes the traffic that is transmitted during the transmission opportunity 110.

In particular embodiments, the access points 106 transmit a response to the indications before the access points 106 transmit during their respective time slots 112. when the leader of the control group receives the responses, the leader determines that the access points 106 are about to make their transmissions. When the leader does not receive the response from an access point, the leader determines that the access point will not transmit during the time slot 112. In certain embodiments, the access points 106 transmit a response to signal the end of a transmission. When the leader of the control group receives this response, the leader of the control group may proceed to the next time slot 112.

In some embodiments, the access point 106B attempts to schedule a transmission into the time slot 112B. The access point 106B may observe certain priority or sequencing requirements when scheduling transmissions into this gap time slot 112B. For example, if packets in a sequence of packets are scheduled for transmission at a later time slot 112, then the access point 106B may not schedule transmissions of packets that appear later in the sequence during the time slot 112B. As another example, if traffic of a certain priority is scheduled for a later time slot 112, then the access point 106B may not schedule transmissions of a lesser priority during the time slot 112B.

Similar to how the access point 106B determined that the access points 106A and 106C should transmit simultaneously during the time slot 112A, the access point 106B may determine that it should transmit simultaneously with another access point 106 in the control group during a time slot 112. For example, the access point 106B may determine that, due to its distance from the access point 106D, it should transmit simultaneously with the access point 106D during a time slot 112.

The access point 106B may adjust the scheduling for the time slots 112 based on newly received information even after the access point 106B has scheduled transmissions for the time slots 112. For example, the access point 106B may schedule another access point 106 in the control group to transmit during a time slot based on a new buffer status report received from the access point 106. As a result, the access point 106B dynamically adjusts the scheduling for the time slots 112 to changing network conditions.

In certain embodiments, the access points 106 are assigned to multiple control groups. The access point 106B may need to coordinate with the leaders of other control groups to efficiently schedule transmissions for the access points 106 within the control group led by the access point 106B. Using the example of FIG. 1D, the access point 106C may have made its transmission scheduled for the time slot 112B during a transmission opportunity 110 won by another control group to which the access point 106C is assigned. The access point 106B may receive an indication from the leader of the other control group that the access point 106C has already made its transmission scheduled for the time slot 112B. In response, the access point 106B cuts short the time slot 112B and moves on to communicate the indication 122 for the time slot 112C. In this manner, the access point 106B does not wait for the access point 106C to make a transmission that the access point 106C has already made.

In certain embodiments, the access points 106 reserve time slots 112 before the leader of the control group schedules transmissions for the time slot 112. Using the example of FIG. 1D, the access point 106A may communicate a reservation to the access point 106B before any of the access points 106A, 106B, 106C and 106D have won contention of the transmission opportunity 110. The reservation may indicate to the access point 106B that the access point 106A has traffic waiting for transmission. In response to the reservation, the access point 106B schedules a time slot 112 for the access point 106A when an access point 106 in the control group wins contention of the transmission opportunity 110. For example, the access point 106B may schedule the transmission for the access point 106A during the time slot 112C in response to the reservation communicated by the access point 106A. A common clock (e.g., in the control group or in the system 100) may be used to coordinate the reservation of time slots 112.

Figure 2:
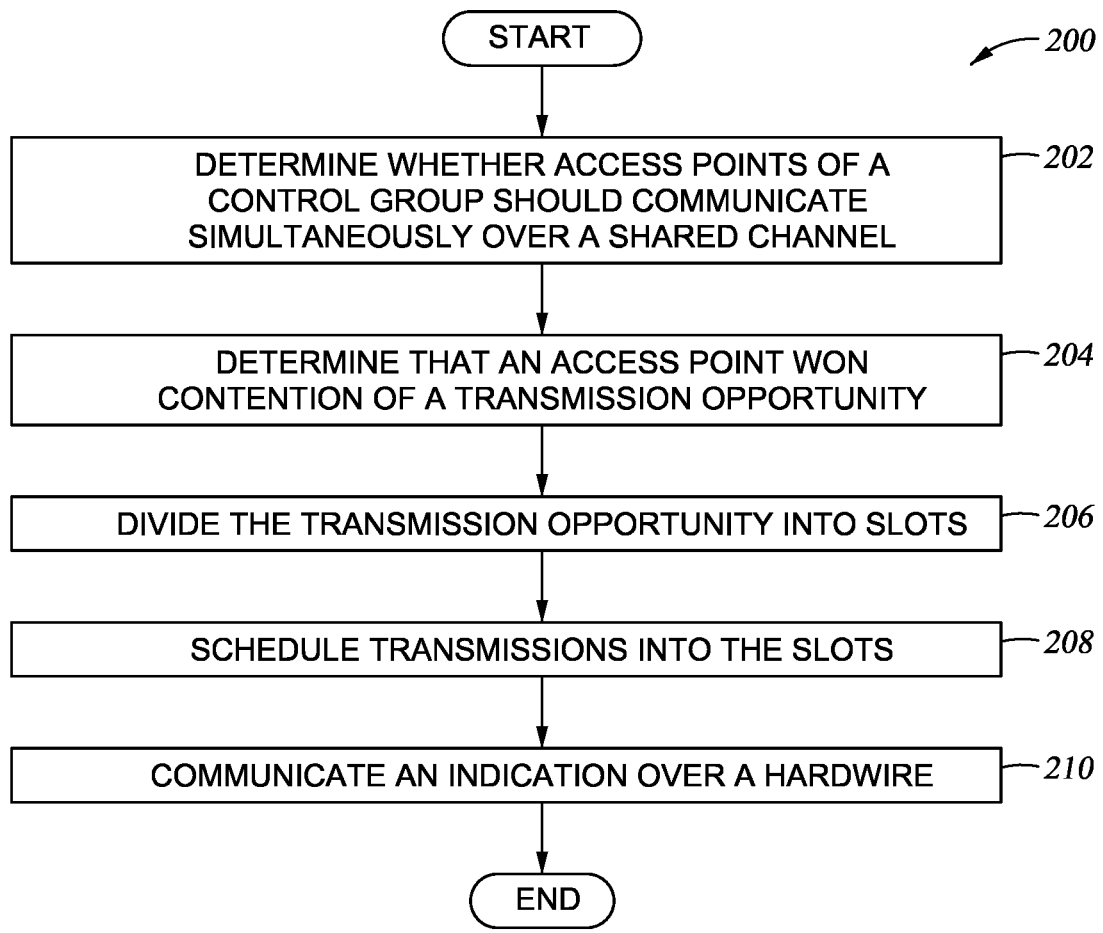
FIG. 2 is a flowchart of an example method performed in the system of FIG. 1A.

FIG. 2 is a flowchart of an example method 200 performed in the system 100 in FIG. 1A. In certain embodiments, an access point 106 that leads a control group 108 performs the method 200 to coordinate the transmissions of the access points 106 within the control group 108, which reduces congestion and/or interference.

In block 202, the leader of the control group 108 determines whether access points 106 of the control group 108 should communicate simultaneously over a shared channel (e.g., according to a CSR process). The leader of the control group 108 may make this determination by considering various signal metrics reported by the access points 106. For example, the leader may consider distances between the access points 106 (e.g., as indicated by inter-access points signal strengths reported by the access points 106). If the access points 106 are sufficiently far from one another, then the leader of the control group 108 may determine that the access points 106 should communicate simultaneously over the shared channel. If the access points 106 are not sufficiently far from one another, then the leader of the control group 108 determines that the access points 106 should not communicate simultaneously over the shared channel (e.g., according to a TDMA process).

In block 204, the leader of the control group 108 determines that one of the access points 106 in the control group 108 won contention of a transmission opportunity 110. The access point 106 may have communicated, to the leader of the control group 108 and over a hardwire 107, that the access point 106 won contention of the transmission opportunity 110. The leader of the control group 108 then shares the transmission opportunity 110 amongst the access points 106 in the control group 108. In block 206, the leader of the control group 108 divides the transmission opportunity 110 into time slots 112. The access points 106 in the control group 108 may then be scheduled into the time slots 112, effectively sharing the transmission opportunity 110. The leader of the control group 108 may divide the transmission opportunity 110 into any suitable number of time slots 112 to allow the access points 106 in the control group 108 sufficient time to make transmissions during those time slots 112.

In block 208, the leader of the control group 108 schedules transmissions into the time slots 112. The leader of the control group 108 may schedule these transmissions using any suitable information. For example, the leader of the control group 108 may examine buffer status reports from the access points 106 in the control group 108 to determine an amount of traffic waiting for transmission at each access point 106 or at devices 104 connected to each access point 106. The leader of the control group 108 then schedules transmissions for the access points 106 based on the amount of traffic awaiting transmission. The more traffic that is awaiting transmission at an access point 106 or at devices 104 connected to the access point 106, the more transmissions that the leader of the control group 108 schedules for the access point 106.

In block 210, the leader of the control group 108 communicates an indication over a separate network (e.g., a wired network supported by a hardwire 107 and separate from the network that provides the shared channel). The indication instructs one or more access points 106 in the control group 108 to communicate during a time slot 112 of the transmission opportunity 110. If the leader of the control group 108 determines that multiple access points 106 should communicate simultaneously in block 202, then the leader of the control group 108 may communicate the indication over the hardwire 107 to the multiple access points 106 to instruct the access points 106 to transmit during the time slot 112. If the leader of the control group 108 determines that an access point 106 should transmit by itself during a time slot 112, then the leader of the control group 108 communicates the indication to that access point 106 instructing that access point 106 to transmit during that time slot 112. In some embodiments, the indication includes a minimum priority of traffic that the access point 106 is allowed to transmit during a time slot 112. In response, the access point 106 transmits traffic with the priority that meets or exceeds that minimum priority during the time slot 112. As a result, the leader of the control group 108 controls the priority of traffic that is transmitted during the time slots 112.

Figure 3:
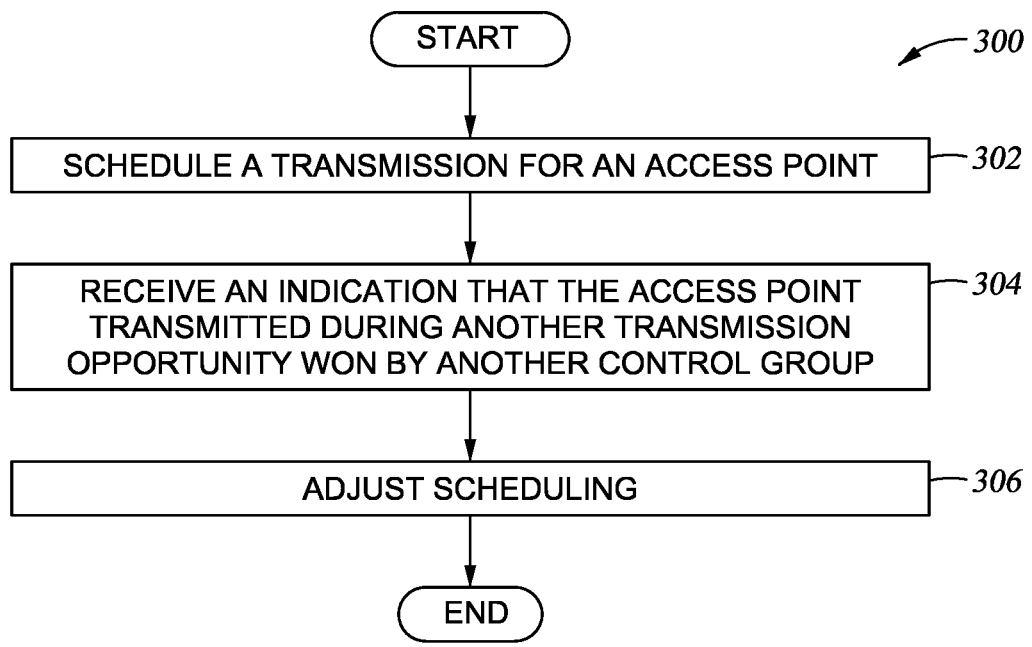
FIG. 3 is a flowchart of an example method performed in the system of FIG. 1A.

FIG. 3 is a flowchart of an example method 300 performed in the system 100 of FIG. 1A. In particular embodiments, the leader of a control group 108 performs the method 300 to coordinate transmissions for the access points 106 in the control group 108 when the access points 106 are assigned to multiple control groups 108. As discussed previously, when access points 106 are assigned to multiple control groups 108, additional communication and coordination may be performed between leaders of different control groups 108.

In block 302, the leader of the control group 108 schedules a transmission for an access point 106 in the control group 108. The leader of the control group 108 may have scheduled the transmission based on buffer status reports communicated by the access point 106 indicating that traffic is awaiting transmission at the access point 106. In block 304, the leader of the control group 108 receives an indication that the access point 106 transmitted during another transmission opportunity 110 won by another control group 108. The leader of the other control group 108 may have communicated the indication to the leader of the control group 108.

In response to the indication, the leader of the control group 108 may take any number of actions to adjust the scheduling of transmissions for the control group 108 in block 306. For example, the leader of the control group 108 may reschedule a transmission for a time slot 112 that had been scheduled for the access point 106. As another example, the leader of the control group 108 may proceed to another time slot 112 without waiting for the access point 106 to transmit. As yet another example, the leader of the control group 108 may allow the access point 106 to transmit another message or packet during the time slot 112 so long as certain constraints are met (e.g., uplink/downlink constraints, sequencing of packets constraints, minimum priority constraints, and/or efficiency constraints). As a result, the leader of the control group 108 coordinates the transmissions of the access points 106 in the control group 108 while allowing those access points 106 to transmit during transmission opportunities won by other control groups 108.

In summary, a system 100 includes access points 106 that are assigned to control groups 108. Each control group 108 has an access point 106 that serves as the leader of the control group 108. When an access point 106 in the control group 108 wins contention of a transmission opportunity 110, the leader of the control group 108 divides the transmission opportunity 110 into time slots 112. The leader then schedules transmissions for the access points 106 in the control group 108 to the time slots 112. For example, the leader may determine whether certain access points 106 in the control group 108 can transmit simultaneously during the same time slot 112 (e.g., according to a CSR process) or whether the access points 106 should transmit in separate time slots 112 (e.g., according to a TDMA process). The leader then communicates an indication of the scheduling to the access points 106 in the control group over a separate wired or wireless. In this manner, the system 100 reduces congestion and interference in the network by coordinating the access points 106 using control groups 108, in certain embodiments. Additionally, the system 100 further reduces wireless congestion and interference by coordinating the access points 106 over a separate network.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
in response to determining that one of a plurality of access points won contention of a transmission opportunity for a shared channel in a first network, dividing the transmission opportunity into a plurality of time slots;
determining, based on one or more of a first distance or a first signal strength between a first access point of the plurality of access points and a second access point of the plurality of access points, that the first access point and the second access point are allowed to communicate simultaneously over the shared channel, wherein one or more of the first distance or the first signal strength is reported by an access point of the plurality of access points;
scheduling transmissions of the first and second access points into a first time slot of the plurality of time slots in response to determining that the first access point and the second access point are allowed to communicate simultaneously over the shared channel;
determining, based on one or more of a second distance or a second signal strength between (i) the first access point and a third access point of the plurality of access points or (ii) the second access point and the third access point, that the third access point should communicate separately from the first access point or the second access point, wherein one or more of the second distance or the second signal strength is reported by an access point of the plurality of access points;
scheduling transmissions of the third access point into a second time slot of the plurality of time slots different from the first time slot in response to determining that the third access point should communicate separately from the first access point or the second access point;

communicating, to the second access point over one of a wired network or a second network different from the first network, an indication that the second access point should communicate during the first time slot of the plurality of time slots; and communicating, to the third access point over one of the wired network or the second network, an indication that the third access point should communicate during the second time slot.

2. The method of claim 1, wherein determining whether the first access point and the second access point should communicate simultaneously over the shared channel is performed by the first access point.

3. The method of claim 1, wherein the indication comprises a minimum priority of traffic that the second access point is allowed to transmit during the first time slot.

4. The method of claim 1, further comprising receiving an indication that the second access point transmitted during a second transmission opportunity won by a first control group different from a second control group comprising the one of the plurality of access points that won contention of the transmission opportunity, wherein the second access point is assigned to the second control group.

5. The method of claim 1, further comprising:
receiving a first buffer status report from the first access point;
receiving a second buffer status report from the second access point; and
scheduling the plurality of access points to communicate during the plurality of time slots based on the first and second buffer status reports.

6. The method of claim 1, further comprising receiving, from the first access point, a reservation for a time slot of the plurality of time slots before the one of the plurality of access points won contention of the transmission opportunity.

7. The method of claim 1, further comprising communicating, to the first access point, an indication of whether the first access point should communicate during the first time slot.

8. An access point comprising:
a memory; and
a hardware processor communicatively coupled to the memory, the hardware processor configured to:
in response to determining that one of a plurality of access points won contention of a transmission opportunity for a shared channel in a first network, divide the transmission opportunity into a plurality of time slots;
determine, based on one or more of a first distance or a first signal strength between a first access point of the plurality of access points and a second access point of the plurality of access points, that the first access point and the second access point are allowed to communicate simultaneously over the shared channel, wherein one or more of the first distance or the first signal strength is reported by an access point of the plurality of access points;
schedule transmissions of the first and second access points into a first time slot of the plurality of time slots in response to determining that the first access point and the second access point are allowed to communicate simultaneously over the shared channel;
determine, based on one or more of a second distance or a second signal strength between (i) the first access point and a third access point of the plurality of access points or (ii) the second access point and the third access point, that the third access point should communicate separately from the first access point or the second access point, wherein one or more of the second distance or the second signal strength is reported by an access point of the plurality of access points;
schedule transmissions of the third access point into a second time slot of the plurality of time slots different from the first time slot in response to determining that the third access point should communicate separately from the first access point or the second access point;
communicate, to the second access point and over one of a wired network or a second network different from the first network, an indication that the second access point should communicate during the first time slot of the plurality of time slots; and
communicate, to the third access point over one of the wired network or the second network, an indication that the third access point should communicate during the second time slot.

9. The access point of claim 8, wherein determining whether the first access point and the second access point should communicate simultaneously over the shared channel is based on a distance between the first access point and the second access point.

10. The access point of claim 8, wherein the indication comprises a minimum priority of traffic that the second access point is allowed to transmit during the first time slot.

11. The access point of claim 8, the hardware processor is further configured to receive an indication that the second access point transmitted during a second transmission opportunity won by a first control group different from a second control group comprising the one of the plurality of access points that won contention of the transmission opportunity, wherein the second access point is assigned to the second control group.

12. The access point of claim 8, the hardware processor further configured to:
receive a first buffer status report from the first access point;
receive a second buffer status report from the second access point; and
schedule the plurality of access points to communicate during the plurality of time slots based on the first and second buffer status reports.

13. The access point of claim 8, the hardware processor further configured to receive, from the first access point, a reservation for a time slot of the plurality of time slots before the one of the plurality of access points won contention of the transmission opportunity.

14. The access point of claim 8, the hardware processor further configured to communicate, to the first access point, an indication of whether the first access point should communicate during the first time slot.

15. A method comprising:
dividing a transmission opportunity for a shared channel in a first network into a plurality of time slots comprising a first time slot and a second time slot different from the first time slot;
determining, based on one or more of a first distance or a first signal strength between a first access point of a plurality of access points and a second access point of the plurality of access points, that the first access point and the second access point are allowed to communicate simultaneously over the shared channel, wherein one or more of the first distance or the first signal strength is reported by one of the plurality of access points;

scheduling transmissions of the first access point and the second access point into the first time slot in response to determining that the first access point and the second access point are allowed to communicate simultaneously over the shared channel;

determining, based on one or more of a second distance or a second signal strength between (i) the first access point and a third access point of the plurality of access points or (ii) the second access point and the third access point, that the third access point should communicate separately from the first access point or the second access point, wherein one or more of the second distance or the second signal strength is reported by one of the plurality of access points;

scheduling transmissions of the third access point into the second time slot in response to determining that the third access point should communicate separately from the first access point or the second access point;

communicating, to the second access point and over one of a wired network or a second network different from the first network, an indication that the second access point should communicate during the first time slot; and communicating, to the third access point over one of the wired network or the second network, an indication that the third access point should communicate during the second time slot.

16. The method of claim 15, further comprising communicating, to the first access point, an indication of whether the first access point should communicate during the first time slot.

17. The method of claim 15, wherein the indication comprises a minimum priority of traffic that the plurality of access points are allowed to transmit during the first time slot.

18. The method of claim 15, further comprising receiving an indication that an access point of the plurality of access points transmitted during a second transmission opportunity won by a first control group different from a second control group that won contention of the transmission opportunity, wherein the access point of the plurality of access points is assigned to the second control group.

19. The method of claim 15, further comprising:
  receiving buffer status reports from the plurality of access points; and
  scheduling the plurality of access points to communicate during the plurality of time slots based on the buffer status reports.

20. The method of claim 15, further comprising receiving a reservation for a time slot of the plurality of time slots.

* * * * *